(12) United States Patent
Lortz et al.

(10) Patent No.: US 8,001,584 B2
(45) Date of Patent: Aug. 16, 2011

(54) METHOD FOR SECURE DEVICE DISCOVERY AND INTRODUCTION

(75) Inventors: Victor B. Lortz, Beaverton, OR (US); Jesse Walker, Portland, OR (US); Preston J. Hunt, Portland, OR (US); Amol Kulkarni, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 11/241,589

(22) Filed: Sep. 30, 2005

(65) Prior Publication Data
US 2007/0079362 A1    Apr. 5, 2007

(51) Int. Cl.
*H04L 9/32* (2006.01)
(52) U.S. Cl. ............... 726/5; 713/156; 713/168
(58) Field of Classification Search .......... 380/277, 380/30, 47, 259, 278; 713/150, 168, 170, 713/171; 726/4, 13, 30, 24; 719/311; 709/12, 709/14
See application file for complete search history.

(56) References Cited

U.S. PATENT DOCUMENTS

| | | | |
|---|---|---|---|
| 7,454,619 B2 * | 11/2008 | Smetters et al. ............. | 713/171 |
| 2003/0115453 A1 | 6/2003 | Grawrock | |
| 2004/0019786 A1 * | 1/2004 | Zorn et al. .................... | 713/168 |
| 2004/0111600 A1 * | 6/2004 | Kaler et al. ................... | 713/150 |
| 2004/0158738 A1 * | 8/2004 | Tanaka ......................... | 713/200 |
| 2005/0135625 A1 * | 6/2005 | Tanizawa et al. ............ | 380/270 |
| 2005/0177733 A1 | 8/2005 | Stadelmann et al. | |
| 2006/0156388 A1 * | 7/2006 | Stirbu et al. ................... | 726/4 |
| 2006/0259759 A1 * | 11/2006 | Maino et al. ................. | 713/151 |
| 2007/0005955 A1 * | 1/2007 | Pyle et al. .................... | 713/156 |
| 2007/0127719 A1 * | 6/2007 | Selander et al. ............. | 380/277 |
| 2007/0288743 A1 * | 12/2007 | Cam-Winget et al. ....... | 713/150 |

FOREIGN PATENT DOCUMENTS

| | | |
|---|---|---|
| EP | 1513288 | 3/2005 |
| EP | 1 538 779 A | 6/2005 |
| WO | WO 2004/028071 A1 | 4/2004 |
| WO | WO-2005/067685 | 7/2005 |

OTHER PUBLICATIONS

International Application No. PCT/US2006/038114 Int'l Search Report & Written Opinion dated Feb. 19, 2007.
Int'l Preliminary Report on Patentability (Chapter 1) issued Apr. 1, 2008 for International Application No. PCT/US2006/038114.
Office Action mailed Apr. 24, 2009 for Chinese Patent Application No. 200610163914.5 with translation, Whole document.
Office Action for Chinese Patent Application No. 200610163914.5 mailed Dec. 25, 2009, 22 pgs.
Office Action for Chinese Patent Application No. 200610163914.5 mailed Aug. 31, 2010, 7 pgs.
Office Action for European Patent Application No. 06 804 267.0 mailed Sep. 9, 2010, 10 pgs.

* cited by examiner

*Primary Examiner* — Vivek Srivastava
*Assistant Examiner* — Nega Woldemariam
(74) *Attorney, Agent, or Firm* — Blakely, Sokoloff, Taylor & Zafman LLP

(57) ABSTRACT

A first message is transmitted over a communication channel to initiate a transaction. The first message contains a random number and a public key of a device. Continuing the transaction, a second message is received. The second message also contains a random number and a public key of a second device. At least one message is received that contains a proof-of-possession of the device's password, along with a credential that is encrypted with a credential key.

20 Claims, 5 Drawing Sheets

METHOD FOR SECURE DEVICE DISCOVERY AND INTRODUCTION

FIELD OF THE INVENTION

The invention relates to network device configuration. More specifically, the invention relates to secure methods of configuring devices to gain access to network resources.

BACKGROUND

Wireless communication between computing devices has enjoyed wide adoption and significant growth as a flexible and cost-effective alternative to traditional hard-wired network infrastructure. Wireless technologies such as WiFi (a common name for several related standards proposed by the Institute of Electrical and Electronics Engineers, "IEEE") and Bluetooth permit data transfer via radio signals in 2.4 GHz, 5 GHz, and other bands. New standards and improved equipment have increased data rates of wireless networks, but the technology has some issues that have not been satisfactorily addressed. Configurability and security of wireless networks are two of these.

Wireless networks rely on encryption of packets to prevent eavesdropping and unauthorized use of network resources. For example, the Wired Equivalent Policy ("WEP"), which is a part of IEEE standard 802.11 describing wireless communications, specifies the encryption to be used in WiFi networks. Likewise, Wi-Fi Protected Access (WPA) is an alternative encryption and authentication standard based on mechanisms defined in the IEEE 802.11i standard. However, products supporting WEP, WPA, and similar security standards typically are difficult to configure correctly, so wireless networks are often run in unencrypted, "open" mode. Furthermore, even when encryption is enabled on a wireless local area network ("WLAN"), the participating systems often lack a standardized way to change the security configuration. Easy-to-use, broadly-applicable procedures to configure and manage WLAN participants may be of considerable value in the field.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
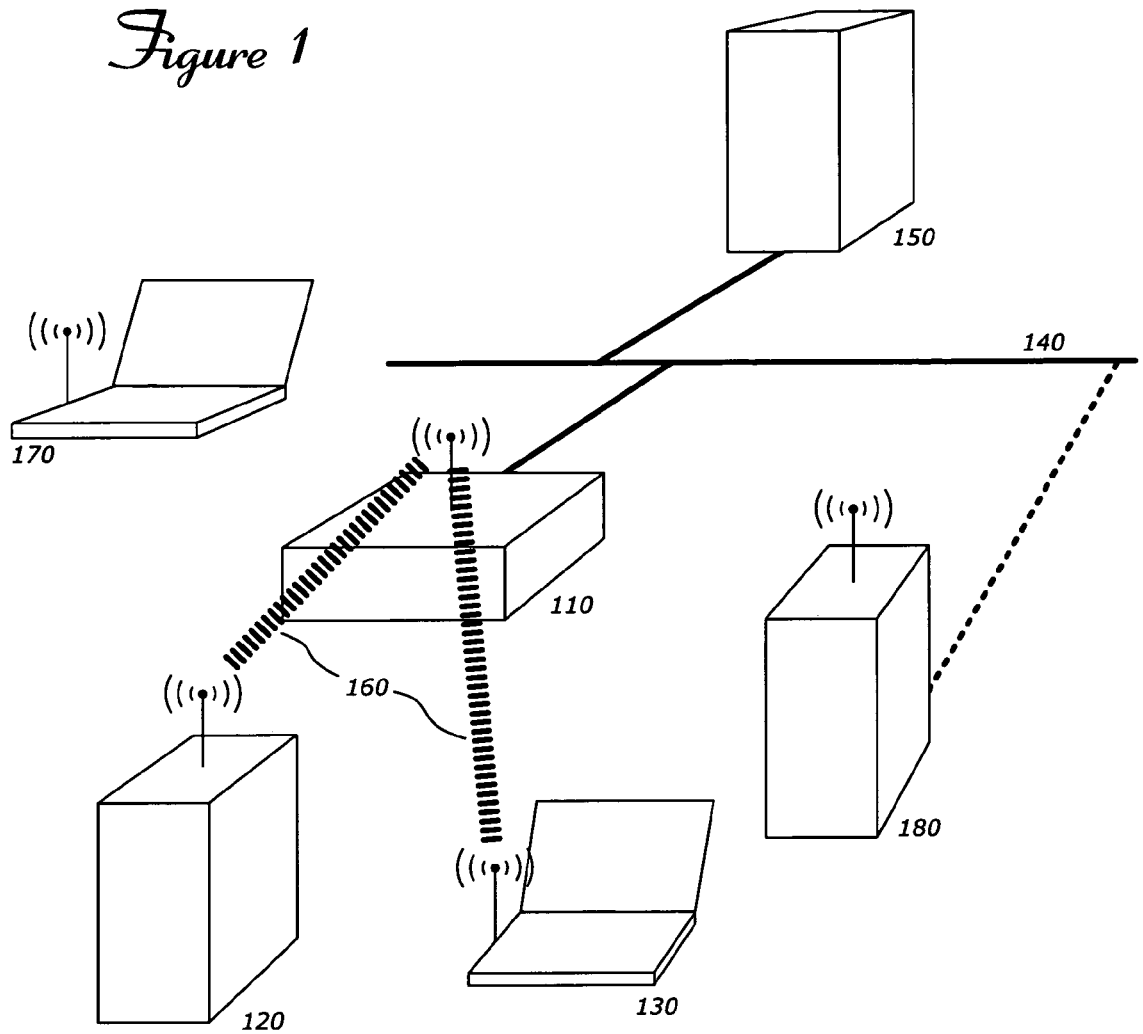
FIG. 1 shows an local area network ("LAN") environment including an embodiment of the invention.

FIG. 1 shows entities that can make use of an embodiment of the invention to transfer credentials in a wireless local area network ("WLAN") environment. Credentials may be passwords or encryption keys required to obtain access to network resources, or other configuration information that is useful or necessary to operate a WLAN device. Access point ("AP") 110 is a central element in many WLANs: it communicates with one or more stations 120, 130 that use the wireless network, and may copy data packets to or from a traditional wired network 140 so that stations 120 and 130 can communicate with devices such as server 150 that lack a wireless interface. If WEP or WPA security is in effect, devices such as stations 120 and 130 must share an encryption key with AP 110. In this figure, WEP- or WPA-protected connections are indicated with thick dashed lines 160.

If the user of a device such as WLAN client laptop 170 wishes to use the wireless network through AP 110 to access resources on other wireless or wired nodes, he must obtain a valid encryption key and enter it into the wireless device's configuration. Traditionally, an administrator of the wireless network would provide the key and the user would type it into a configuration form. However, this approach is inconvenient for the user and cumbersome for the administrator. In addition, an unauthorized user may obtain a copy of the key from the user and use it to access the network. Changing the WLAN configuration to exclude such an unauthorized user may entail re-configuring all of the other authorized devices.

A superior method of managing access to the WLAN can be built on a registration protocol according to an embodiment of the invention. The protocol involves AP 110, new WLAN client 170 and a network entity called the registrar, shown in this figure as device 180. In other embodiments, the registrar may be integrated with the AP. Some networks may use several registrars.

Registrar 180 may communicate with AP 110 over the wired network 140, over a wireless (radio) connection, or both. The registrar may provide administrative facilities to monitor the WLAN and manage WEP encryption keys.

New WLAN client 170 has an associated identifier called a device password. The password may be engraved on the device or printed on a label, or may be displayed by the device or by software associated with the device. If the device password is displayed in this way, it may be dynamic (for example, the displayed password may be valid for a period of time or until some event occurs, then a new device password may be chosen and displayed). In some embodiments, the device password may be readable by a reader device near the new client. For example, Near Field Communication ("NFC") devices can exchange data wirelessly over a short distance, so a device password might be stored in an NFC token and read by an NFC reader. In another embodiment, the new WLAN client might be equipped with an infrared or other light signal transmitter, and be able to transmit the device password to an optical receiver of the registrar within line-of-sight proximity.

Figure 2A:
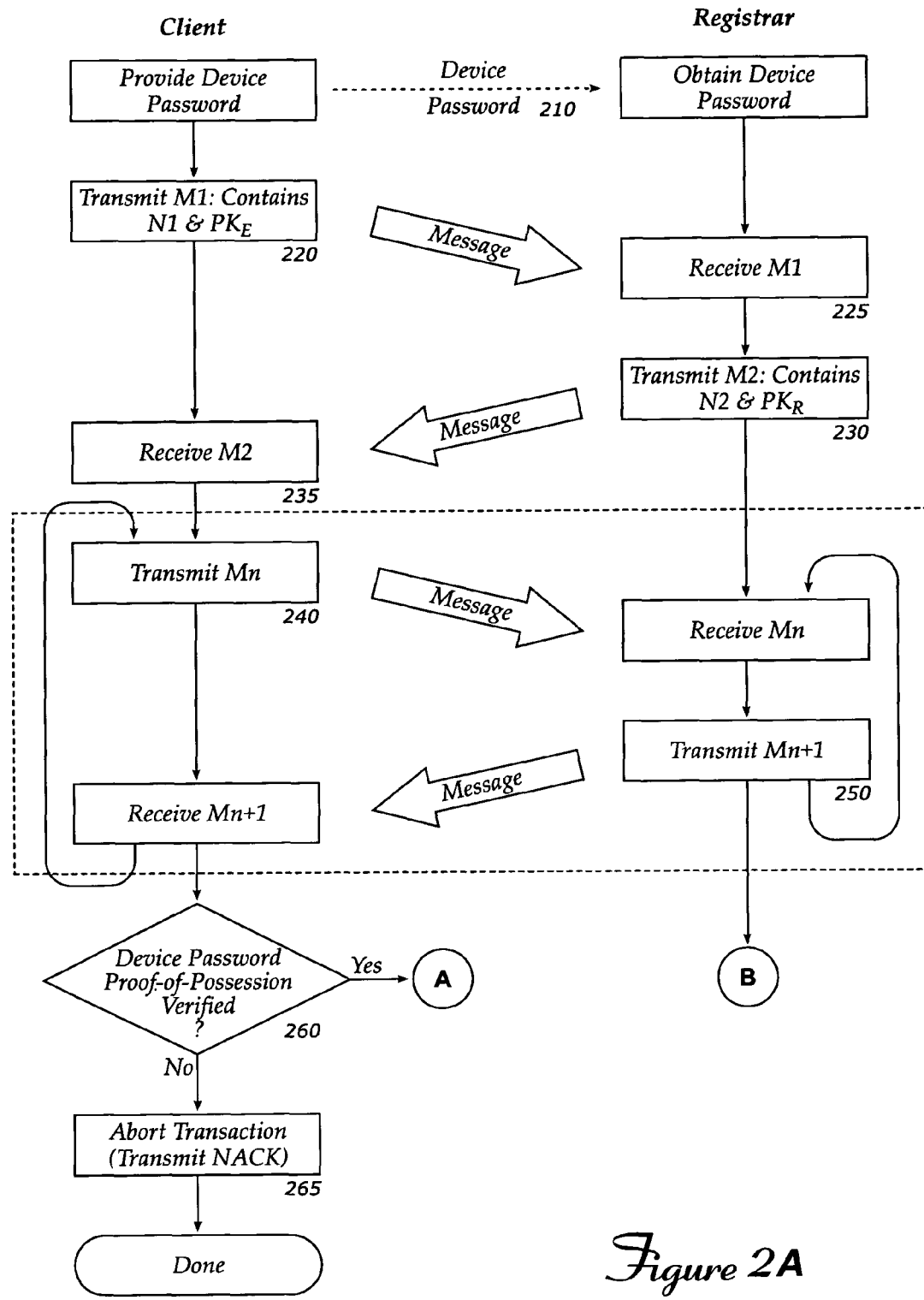
FIGS. 2A and 2B are a flow chart of a protocol transaction according to an embodiment of the invention.
Figure 2B:
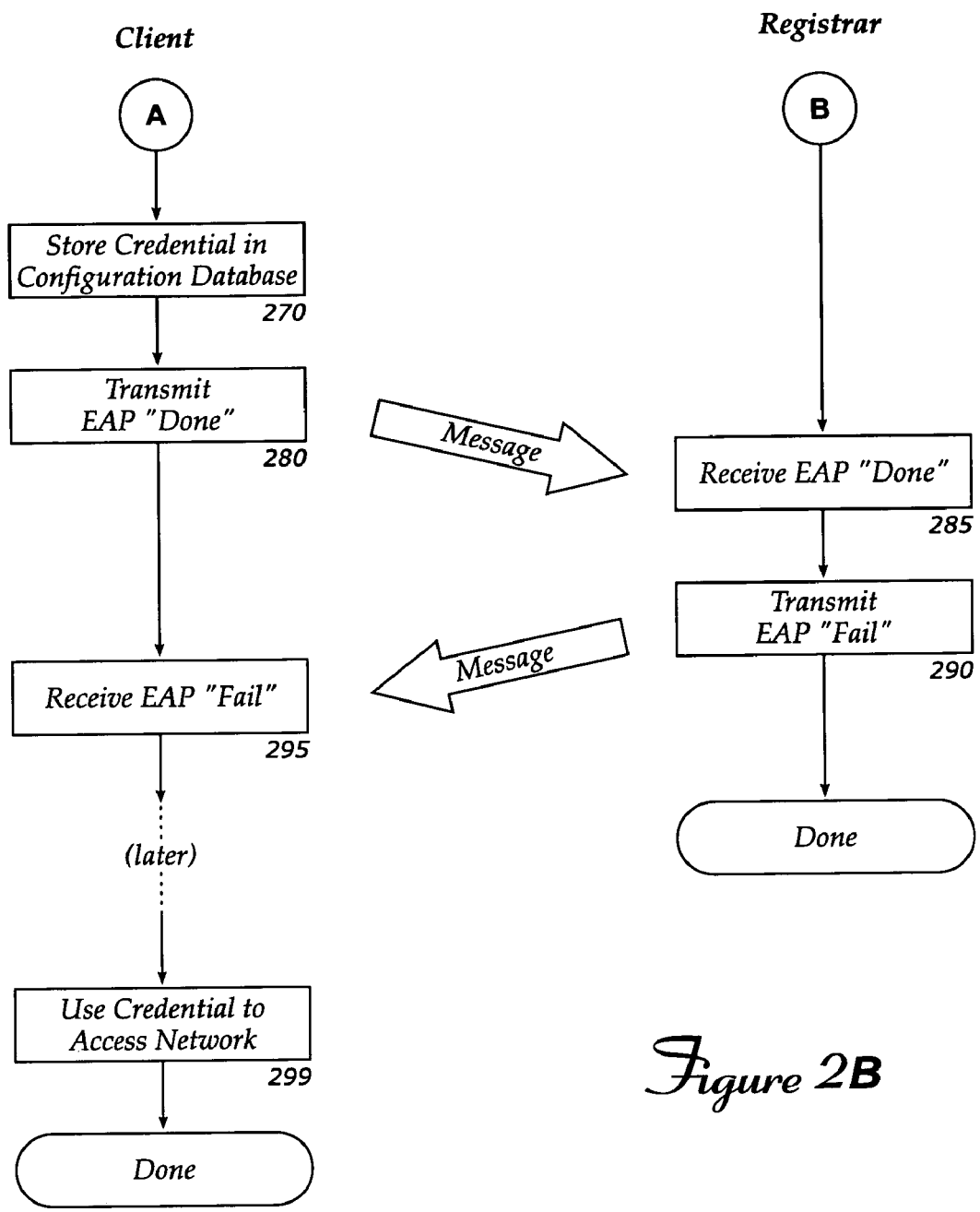

Registrar 180, AP 110 and client 170 can interact according to the flow chart of FIGS. 2A and 2B to securely transfer a credential such as a WEP key from the registrar to the client. All messages can be sent in-band (for example, over the wireless communication channel), or some messages can be sent over a different channel. The embodiment described with reference to this figure uses the Extensible Authentication Protocol ("EAP"), as described in the Internet Engineering Task Force ("IETF") Request for Comments ("RFC") number 3748 dated June 2004, as a framework for transmitting and receiving many of the messages in the protocol. However, messages according to embodiments of the invention can be embedded within other communication frameworks or transmitted as raw data over any sort of communication channel.

First, the client's device password is provided to the registrar (210). This may be accomplished by reading the password from the client's label or display and entering it through a registrar user interface, by placing the client near the registrar so that the registrar can read the client's NFC token automatically, or other similar method. This portion of the protocol may incorporate human involvement (for example, to read and enter the device password, or to place the client near the registrar). The remainder of the protocol can continue automatically.

Next, the client transmits a first message ("M1") to initiate an EAP transaction (220). M1 contains a first random number N1 and a public key $PK_E$ of the client, and may contain other information (described below). M1 is received by the registrar (225).

The registrar responds to M1 by transmitting a second message ("M2") containing a second random number N2 and a public key $PK_R$ of the registrar (230). The client receives M2. (235).

The transaction continues with the client transmitting a message Mn (240) and the registrar responding with message Mn+1 (250). Portions of each message may be encrypted with a key known to both the client and the registrar, or with a public or private key of one of the parties. Messages may have appended a keyed message authentication code ("HMAC"), containing a keyed cryptographic hash of the previous message and a portion of the current message preceding the HMAC, to permit the recipient to verify that the other party correctly received the previous message and that no third party is tampering with the messages in transit.

One or more of the messages from the registrar contain information that the client can use to verify that the registrar knows the client's device password. This permits the client to verify that it is receiving credentials from an authorized registrar (e.g. the registrar to which the device password was provided, and not, for example, a rogue registrar that is attempting to trick the client into connecting to a hostile wireless network). The message(s) need not contain the device password itself; instead, information from which the client can infer that the registrar must know the password is sufficient. This information can be thought of as a "proof-of-possession" of the device password.

One or more of the messages from the registrar contains a credential such as a WEP or WPA key that the client can use to access the wireless LAN through the AP. The credential may be encrypted with a credential key to prevent its recovery by an eavesdropper. When the client receives the message containing the credential, it verifies the proof-of-possession to ensure the message came from a registrar with knowledge of its own device password (260). If the proof fails or is unacceptable, the client aborts the EAP transaction by transmitting a negative acknowledge ("NACK") message (265). If the proof-of-possession correctly demonstrates knowledge of the device password, the client may decrypt the credential and store it in a configuration database for future use (FIG. 2B, 270).

Once the client has successfully received the credential, it transmits an EAP "Done" response to the registrar (280), which receives the "Done" message (285) and responds with an EAP "Fail" message (290). The client subsequently receives the "Fail" message (295). Note that in this context, the failure message does not mean that the client must repeat the EAP transaction to obtain a credential. It merely indicates that the transaction was used to provision a credential rather than to grant the client immediate use of the wireless LAN. The client may use the credential it received later, when it attempts to access the network through the AP (299). For example, the client may update its configuration according to data in the credential, or may use the credential to complete a new authentication protocol transaction designed to provide network access.

Table 1 shows the detailed structure of the eight (8) messages exchanged between client ("C") and registrar ("R") according to an embodiment of the invention.

TABLE 1

| Message | Direction | Structure |
|---|---|---|
| M1 | C→R | Version \|\| N1 \|\| Description \|\| $PK_E$ |
| M2 | R→C | Version \|\| N1 \|\| N2 \|\| Description \|\| $PK_R$ |
| M3 | C→R | Version \|\| N2 \|\| E-Hash1 \|\| E-Hash2 \|\| $HMAC_{AuthKey}(M1\|\|M2^*)$ |
| M4 | R→C | Version \|\| N1 \|\| R-Hash1 \|\| R-Hash2 \|\| $ENC_{KeyWrapKey}(R\text{-}S1)$ \|\| $HMAC_{AuthKey}(M3\|\|M4^*)$ |
| M5 | C→R | Version \|\| N2 \|\| $ENC_{KeyWrapKey}(E\text{-}S1)$ \|\| $HMAC_{AuthKey}(M4\|\|M5^*)$ |
| M6 | R→C | Version \|\| N1 \|\| $ENC_{KeyWrapKey}(R\text{-}S2)$ \|\| $HMAC_{AuthKey}(M5\|\|M6^*)$ |
| M7 | C→R | Version \|\| N2 \|\| $ENC_{KeyWrapKey}(E\text{-}S2)$ \|\| $HMAC_{AuthKey}(M5\|\|M6^*)$ |
| M8 | R→C | Version \|\| N1 \|\| $ENC_{KeyWrapKey}(Credential)$ \|\| $HMAC_{AuthKey}(M7\|\|M8^*)$ |

The following symbols and abbreviations are used in Table 1:

TABLE 2

| Symbol | Meaning |
|---|---|
| \|\| | Concatenation of parameters |
| $M_n^*$ | Message $M_n$ (excluding a hash value suffix) |
| Version | Protocol version number |
| N1, N2 | 128-bit random numbers |
| Description | Text string describing a device that transmitted the corresponding message |
| $PK_E$ | Diffie-Hellman public key of client |
| $PK_R$ | Diffie-Hellman public key of registrar |
| E-S1, E-S2 | Two secret random numbers selected by client |
| E-Hash1, E-Hash2 | Keyed cryptographic hashes of E-S1 and E-S2, respectively (each hashed together with separate halves of the client's device password) |
| R-S1, R-S2 | Two secret random numbers selected by registrar |
| R-Hash1, R-Hash2 | Keyed cryptographic hashes of R-S1 and R-S2, respectively (each hashed together with separate halves of the client's device password) |
| $Enc_{Key}(item)$ | Item encrypted with Key |
| $HMAC_{Key}(item)$ | HMAC keyed hash of item using key Key |

In the embodiment defined by messages M1-M8, the participants in the registration protocol identify themselves in their first messages (M1 and M2). The "Description" portion of those messages may provide a free-form description of the device, or may instead be a standardized text string. Some embodiments may include several identification substrings with contents, lengths and/or delimiters agreed upon by the parties participating in the protocol. If the protocol is implemented as an EAP method on top of the IEEE 802.1X framework, a predefined EAP Identity may be used to select that EAP method. For example, a client seeking a credential might use an EAP Identity string such as "SomePrefix-Enrollee-1-0". In this standardized string, "1" and "0" may represent protocol or other version numbers; more advanced clients may transmit a similar string with higher integers instead of "1" and "0." SomePrefix indicates a commonly-known string that the participants agree to use, and not the literal sequence of characters "SomePrefix." An example commonly-known string is "WFA-SimpleConfig".

As mentioned earlier, messages M3-M8 contain a message authentication code ("MAC") to permit the recipient to verify that the protocol messages have not been corrupted or tampered with. In this embodiment, the MAC of a message is a cryptographic hash calculated over the data of the previous message and data of the current message, excluding the MAC portion of the current message. $HMAC_{key}$ is a keyed hash, which can only be generated or validated by a party that possesses the key. Selection of keys is discussed below.

Figure 3A:
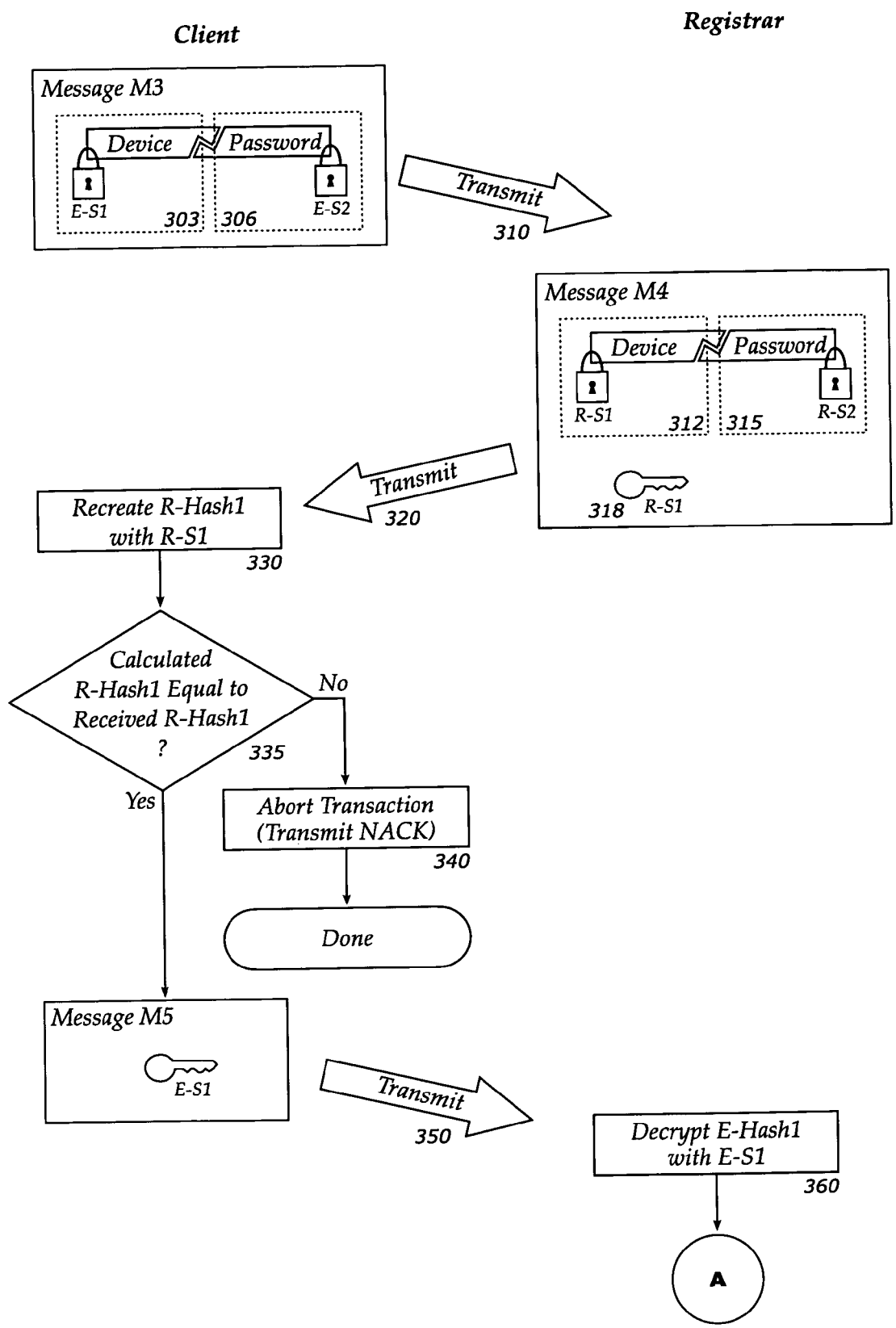
FIGS. 3A and 3B illustrate the security benefits of a portion of the protocol.

In an embodiment that uses the eight messages shown in Table 1, note that the client and registrar each divide the device password into two portions and incrementally and Alternatingly prove knowledge of those two portions in several successive messages (M3-M7). This improves the security of the protocol by thwarting a potential attack to obtain the device password, as explained here with reference to FIGS. 3A and 3B.

The client commits to prior knowledge of both halves of its device password by first transmitting E-Hash1 303 and E-Hash2 306 (310). E-Hash1 and E-Hash2 correspond to hashes of random numbers E-S1 and E-S2 with the first and second halves of the device password, respectively. For additional security, the keyed hash used to generate E-Hash1 303 and E-Hash2 306 may incorporate information to tie the hash values to the current enactment of the protocol. For example, the key of the keyed hash could depend in an irreversible way on the random numbers N1 and N2 in the first two messages.

Figure 3B:
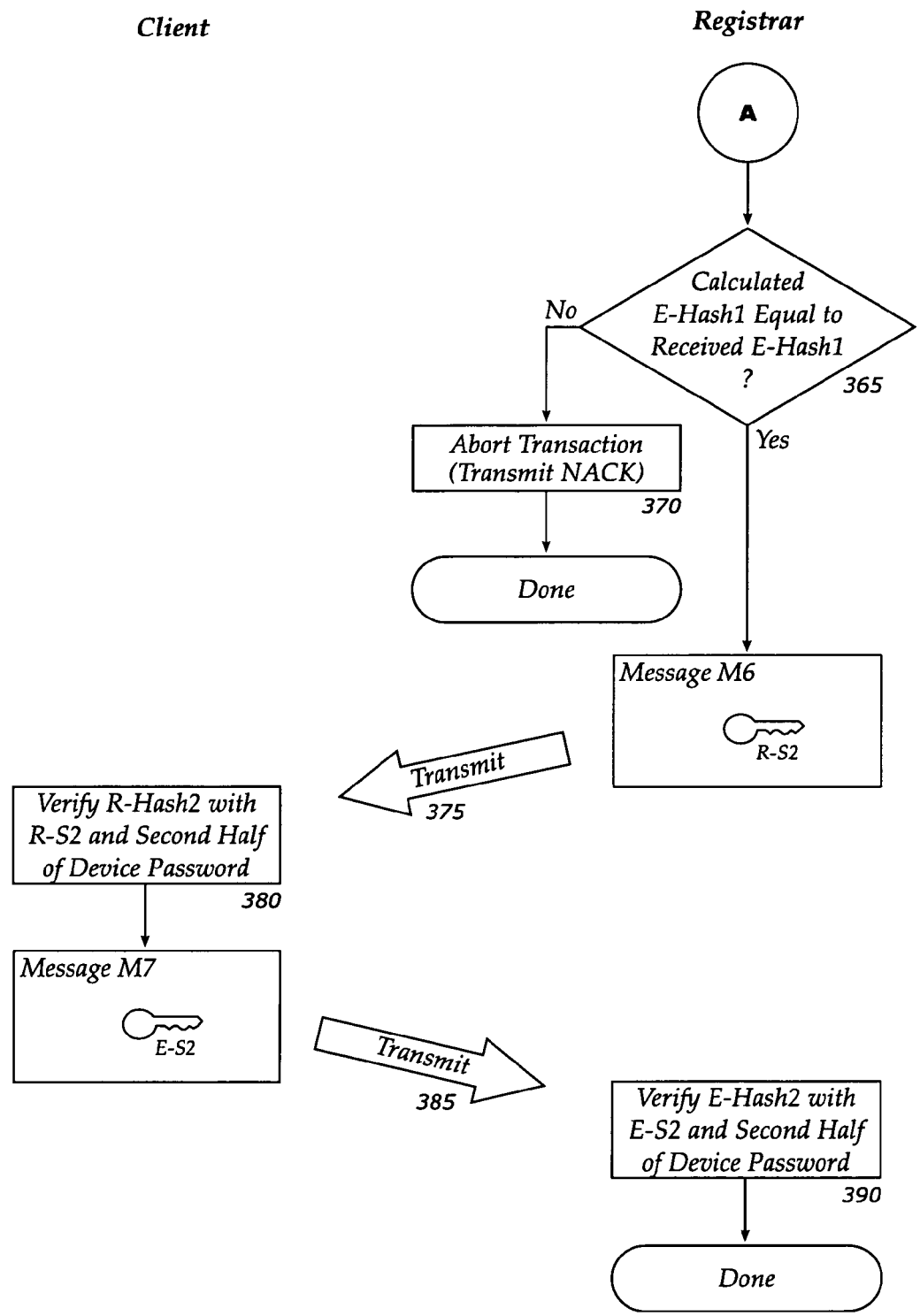

The registrar likewise pre-commits to knowledge of both halves of the device password using R-Hash1 312 and R-Hash2 315 (320). The registrar also provides R-S1 318, which the client can use to recreate R-Hash1 (330). If the client finds that R-Hash1 does not match the hash value it calculates using the first portion of its true device password and R-S1 (335), it can abort the EAP transaction (by sending an EAP negative acknowledge ("NACK")) (340), without disclosing any information about its true password. If the first portion of the device password from the registrar is verified, then the client transmits E-S1 in message M5 (350). E-S1 permits the registrar to verify that the previously-transmitted E-Hash1 303 was computed using the first portion of the same device password. The registrar verifies E-Hash1 with E-S1 (360) using the first portion of the device password it knows (FIG. 3B, 365). If the verification fails, the registrar may abort the EAP transaction by sending an EAP NACK message (370). If the registrar is able to verify the first portion of the device password, it continues with the protocol by transmitting R-S2 in message M6 (375). The client verifies the previously-received R-Hash2 with R-S2 using the second portion of the device password (380). It then transmits E-S2 in message M7 (385) to permit the registrar to complete the verification (390). This portion of the protocol permits the client and registrar to prove to each other that each knows the complete device password, without exposing any portion of the device password in deartext over the communication channel.

Several portions of messages M1-M8 are encrypted to prevent an eavesdropper from learning privileged information such as the device password or the credential. Some of the message parameters—for example, E-S1, E-S2, R-S1 and R-S2—may be random bit strings selected by either the client or the registrar. Other message parameters must be known to both entities so that one side can encrypt and/or authenticate a message and the other side can decrypt and/or authenticate it. Some embodiments of the invention will use a key derivation key ("KDK") that is computed from the Diffie-Hellman secrets, random numbers N1 and N2, and a Media Access Control ("MAC") address of the client. In one embodiment, the KDK is defined as:

$$KDK=HMAC\text{-}SHA\text{-}256_{DHKey}(N1\|Client\text{-}MAC\|N2)$$

where HMAC-SHA-256 is a keyed hash function using key DHKey, which is:

$$DHKey=SHA\text{-}256(g^{AB} \bmod p)$$

$PK_E$, the client public key, is $g^A \bmod p$; and $PK_R$, the registrar public key, is $g^B \bmod p$. SHA-256 is a well-known secure hash algorithm and "mod" indicates modulo arithmetic. Alternate embodiments using other public key technologies such as DSA, RSA, or elliptic curve, may also be used. In these cases, M3 may include a proof-of-possession of the client's public key, and the registrar may encrypt the KDK using the client's public key and send it to the client in M4.

Additional keys may be derived from KDK using a key derivation function ("KDF") to generate a plurality of pseudo-random bits according to an algorithm. A function that may be used by an embodiment to generate a key of n bits is described by the following pseudo-code:

```
KDF( Key, PersonalizationString, NBits ) :
    Result = ""
    Iterations = (NBits + PRFDigestSize - 1)/PRFDigestSize
    for i = 1 to Iterations do
        Result = Result +
            PRF(Key,i||PersonalizationString||NBits)
    return Result[0:NBits]
```

Here, PRF is a function to produce pseudo-random key bits. Some embodiments may use a keyed hash such as HMAC-SHA-256 for this purpose. The AuthKey and KeyWrapKey keys used in messages M3-M8 may be derived as follows:

$$AuthKey\|KeyWrapKey\|ESMK=KDF(KDK, \text{"Wi-Fi Easy and Secure Key Derivation"}, 640)$$

AuthKey may be a 256-bit key used to authenticate messages M3-M8. KeyWrapKey may be a 128-bit key used to encrypt random keys E-S1, E-S2, R-S1 and R-S2 and the credential transferred in M8. ESMK may be a 256-bit key whose use will be discussed later. Summarizing the formulas and pseudo-code above, AuthKey, KeyWrapKey and ESMK are derived according to an algorithm that accepts as inputs the two random numbers N1 and N2, the client's MAC address, and a Diffie-Hellman secret. Subsets of the bits generated by KDF are selected and used for AuthKey, KeyWrapKey and ESMK.

In some embodiments, a portion of the protocol implemented through messages M1-M8 gcan be short-circuited. If a secure communication channel between client and registrar exists, the registrar can use that channel to transmit a credential for the client. For example, if the registrar and client can both use a removable storage medium such as a Universal Serial Bus ("USB") Solid State Disk, then the registrar may write the credential in a file on the USB disk and the client may obtain the credential by reading the file. Information transmitted via the secure channel may still be encrypted to protect against unauthorized access and/or tampering, or to permit the client to verify that the credential came from an authorized registrar. For example, the credential may be encrypted with a symmetric encryption key derived from KDK. In another embodiment, the credential may be encrypted using the client's public RSA key. The fact that the credential is delivered across a trusted out-of-band channel serves to verify the credential's authenticity.

The protocol described above can be used in several additional situations. First, consider the problem of associating a new registrar with an existing access point ("AP"). The protocol can operate between the new registrar and the AP, with the AP taking the role of the client. This use of the protocol might be indicated by a different EAP Identity string. For example, the string "SomePrefix-Registrar-1-0" could indicate to the AP that a registrar wished to associate itself with the AP. As with the previous client identity string, the numbers "1" and "0" might indicate a protocol version, and could be replaced with larger integers by a more advanced registrar. Some protocol messages may be modified to carry information of use in this scenario. For example, the AP may include information about its present configuration when it transmits M7. The configuration information may be encrypted with a configuration key such as KeyWrapKey, which is already used to encrypt E-S2 in that message. The registrar, upon receiving the AP's present configuration, may prepare an updated or new configuration and transmit it to the AP as part of the credential in message M8. The new configuration would also be encrypted in that message.

The protocol could be used again, after a client device had successfully received a credential, if new credentials were to be distributed. This use of the protocol is known as "rekeying." A client participating in a rekeying operation might use a different value for the device password. In one embodiment, the device password could be a 256-bit pseudo-random bit string generated by the Key Derivation Function described earlier:

DevicePassword=KDF(EMSK, N1||N2||"WFA-Rekey-PSK",256)

The foregoing descriptions and explanations detail a secure protocol by which two entities can authenticate each other and transfer a credential over an insecure network such as an 802.11 wireless network or other radio network, a public access network, or the like. The protocol may be used even when the client does not yet have a credential that the AP will accept. In the WLAN case, the client may structure its messages (and receive its replies) according to the IEEE 802.1X protocol. An AP may accept 802.1X-formatted messages and forward them to a registrar (or process them internally, if the AP itself contains a registrar), even though the client transmitting the messages lacks an acceptable WEP key, credential or other security arrangement for secure communication.

Messages according to an embodiment of the invention may also be transmitted over a wired or wireless network as data encapsulated in a higher level protocol such as the User Datagram Protocol ("UDP") or Transmission Control Protocol ("TCP"), running over the Internet Protocol ("IP"). Alternatively, messages could be formatted in the Extensible Markup Language ("XML") and embedded in Hypertext Transfer Protocol ("HTTP") transactions according to the Universal Plug-n-Play ("UPnP™") standard promulgated by the UPnP Forum.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that credentials can be exchanged over public and/or insecure networks by devices consisting of software and hardware that distribute the functions of embodiments of this invention differently than herein described. Such variations and implementations are understood to be apprehended according to the following claims.

We claim:

1. A method for obtaining a credential, comprising:
transmitting a first message from a client device to a registrar device over a wireless communication channel between the client device and the registrar device to initiate a transaction, the first message to contain a first random number and a public key of the client device;
receiving a second message from the registrar device, with the client device, to continue the transaction, the second message to contain a second random number and a public key of the registrar device;
receiving, with the client device, a third message containing a device password proof-of-possession and a credential, the credential to be encrypted with a credential key by transmitting a first half of the device password hashed with the first random number and a second half of the device password hashed with the second random number, wherein the hashes are irreversible;
decrypting the credential with the client device utilizing the first random number with the first half of the device password and the second random number with the second half of the device password;
verifying, with the client device, the proof-of-possession with a device password of the client device; and
if the proof-of-possession is verified, altering a configuration of the client device according to the credential, wherein the configuration enables the client device to access a wireless network securely via a wireless access point.

2. The method of claim 1 wherein the transaction is an Extensible Authentication Protocol ("EAP") transaction.

3. The method of claim 1, further comprising:
generating a plurality of bits by a key derivation function;
wherein the key derivation function generates the plurality of bits according to an algorithm that accepts as inputs the first random number, the second random number and a Media Access Control ("MAC") address of the client device.

4. The method of claim 3, further comprising:
selecting a subset of the plurality of bits to form a second key; and
decrypting the credential with the second key.

5. The method of claim 3, further comprising:
selecting a subset of the plurality of bits as a configuration key;
encrypting a present configuration of the client device with the configuration key; and
transmitting a message containing the encrypted present configuration.

6. The method of claim 1 wherein the credential key is a private key corresponding to the public key of the registrar device.

7. The method of claim 1 wherein the at least one message is received over the communication channel.

8. The method of claim 1 wherein the at least one message is received over a second, different communication channel.

9. The method of claim 8 wherein the second communication channel is a removable storage medium.

10. A system comprising:
a first device having a device password;
an access point ("AP") to provide access to a network to a client having a credential; and
a registrar;

wherein the registrar is to prove its possession of the device password to the first device by transmitting a first half of the device password hashed with the first random number and a second half of the device password hashed with the second random number, wherein the hashes are irreversible;

the first device to transmit a first message over a wireless communication channel between the first device the registrar to initiate a transaction, the first message to contain a first random number and a public key of the first device;

the registrar to transmit a second message to the first device, to continue the transaction, to provide a credential to the first device the second message to contain a second random number and a public key of a second device; and the first device is to use the credential to alter its configuration and access the network through the AP.

11. The system of claim 10 wherein the first device further comprises:
a near-field communication ("NFC") token to contain the device password;
the registrar further comprises:
a near-field communication reader to read an NFC token; and wherein
the registrar is to obtain the first device's device password by reading the first device's NFC token.

12. The system of claim 10 wherein the registrar is to prove its possession of the device password and provide the credential by performing an Extensible Authentication Protocol ("EAP") transaction with the first device.

13. The system of claim 12 wherein the first device is to identify itself in the EAP transaction by a text string of the form "SomePrefix-Enrollee-m-n", where SomePrefix is a predetermined string, and m and n are integers representing a protocol version.

14. The system of claim 10 wherein the first device further comprises a radio communication interface; and
the first device is to receive the credential through the radio communication interface.

15. The system of claim 10 wherein the first device further comprises a removable storage interface; and
the first device is to receive the credential through the removable storage interface.

16. A non-transitory computer-readable medium containing instructions that, when executed by a processor, cause the processor to perform operations comprising:
transmitting a first message from a client device to a registrar device over a wireless communication channel between the client device and the registrar device to initiate a transaction, the first message to contain a first random number and a public key of the client device;

receiving a second message from the registrar device, with the client device, to continue the transaction, the second message to contain a second random number and a public key of the registrar device;

receiving, with the client device, a third message containing a device password proof-of-possession and a credential, the credential to be encrypted with a credential key by transmitting a first half of the device password hashed with the first random number and a second half of the device password hashed with the second random number, wherein the hashes are irreversible;

decrypting the credential with the client device utilizing the first random number with the first half of the device password and the second random number with the second half of the device password;

verifying, with the client device, the proof-of-possession with a device password of the client device; and if the proof-of-possession is verified, altering a configuration of the client device according to the credential, wherein the configuration enables the client device to access a wireless network securely via a wireless access point.

17. The computer-readable medium of claim 16, wherein the transaction is an Extensible Authentication Protocol ("EAP") transaction.

18. The computer-readable medium of claim 16, comprising further instructions that the processor to perform operations comprising:
generating a plurality of bits by a key derivation function;
wherein the key derivation function generates the plurality of bits according to an algorithm that accepts as inputs the first random number, the second random number and a Media Access Control ("MAC") address of the first device.

19. The computer-readable medium of claim 18, comprising further instructions that the processor to perform operations comprising:
selecting a subset of the plurality of bits to form a second key; and
decrypting the credential with the second key.

20. The computer-readable medium of claim 18, comprising further instructions that the processor to perform operations comprising:
selecting a subset of the plurality of bits as a configuration key;
encrypting a present configuration of the client device with the configuration key; and
transmitting a message containing the encrypted present configuration.

* * * * *